United States Patent [19]

Audley et al.

[11] Patent Number: 4,769,359

[45] Date of Patent: Sep. 6, 1988

[54] PROCESS FOR THE PRODUCTION OF ADSORBENT CARBON

[75] Inventors: Gary J. Audley, Weybridge; Keith A. Holder, Bagshot, both of England

[73] Assignee: The British Petroleum Company p.l.c., London, England

[21] Appl. No.: 52,044

[22] PCT Filed: Sep. 17, 1986

[86] PCT No.: PCT/GB86/00554

§ 371 Date: Apr. 21, 1987

§ 102(e) Date: Apr. 21, 1987

[87] PCT Pub. No.: WO87/01686

PCT Pub. Date: Mar. 26, 1987

[30] Foreign Application Priority Data

Sep. 24, 1985 [GB] United Kingdom ................ 8523511

[51] Int. Cl.$^4$ .................... C01B 31/12; B01J 20/20
[52] U.S. Cl. .................... 502/427; 423/461; 502/418
[58] Field of Search ............. 502/427, 418, 184; 423/461; 201/17

[56] References Cited

U.S. PATENT DOCUMENTS

| | | | |
|---|---|---|---|
| 3,166,483 | 1/1965 | Masiantonio | 423/461 |
| 3,387,941 | 6/1968 | Murphy et al. | 423/461 |
| 3,764,561 | 10/1973 | Nishino et al. | 502/427 |
| 4,082,694 | 4/1978 | Wennerberg et al. | 502/427 |

FOREIGN PATENT DOCUMENTS

| | | |
|---|---|---|
| 55922 | 2/1891 | Fed. Rep. of Germany . |
| 310022 | 7/1922 | Fed. Rep. of Germany . |
| 2361808 | 6/1974 | Fed. Rep. of Germany . |
| 2336347 | 7/1977 | France . |
| 226275 | 8/1985 | German Democratic Rep. . |

*Primary Examiner*—Paul E. Konopka
*Attorney, Agent, or Firm*—Morgan & Finnegan

[57] ABSTRACT

A process for the production of active carbon by treating a carbonaceous feed with a mixture of KOH and NaOH in a molar ration of NaOH:KOH of 80:20 to 20:80 and heating to at least 500° C. in an inert atmosphere.

7 Claims, No Drawings

PROCESS FOR THE PRODUCTION OF ADSORBENT CARBON

The present invention relates to a process for the production of adsorbent carbon, in particular active carbons suitable for adsorbing gases e.g. hydrocarbons such as methane.

It is disclosed in U.S. Pat. No. 3,764,561 that activated carbon may be made by treating finely divided coal with a small quantity of an inorganic potassium salt. The specification states that both solid salts and aqueous solutions may be used. The Examples show the formation of a mixture of coal and powdered salts which is then carbonised at low temperatures e.g. 450°–700° C. The specification indicates that the quantity of inorganic potassium salt should not be more than about 2.5% by weight.

U.S. Pat. No. 4,082,694 discloses that activated carbon may be made by heating coal or coal coke or petroleum coke with hydrous KOH so as to dehydrate the mixture, followed by a second heating step at a higher temperature to give the active carbon. The carbon feed is intimately mixed with solid or liquid hydrous KOH. The upper limit of 25% water in the hydrous KOH is set by the ease of handling the alkali and the feed mixture. The description is generally directed to the use of solid KOH rather than liquid.

We have now found a method of producing active carbons which enables high adsorption of gases per unit volume to be obtained.

According to one aspect of the present invention the process for the production of active carbon by treating a carbonaceous feed with KOH and subsequently carbonising the carbonaceous feed is characterised in that the carbonaceous feed is intimately mixed with a hot liquid mixture comprising KOH and NaOH in a molar ratio of NaOH to KOH of from 80:20 to 20:80, heating the mixture to a temperature of at least 500° C., in an inert atmosphere maintaining the mixture at this temperature for not less than 5 minutes, then allowing the carbon to cool in an inert atmosphere to below combustion temperature, followed by washing to remove alkali metal compounds.

The carbonaceous feed may for example be any of the feeds used in the process of U.S. Pat. No. 4,082,694. An example of suitable feedstocks are Pittsburgh No 8 (HVBA) coal cokes and chars. Brown coals or lignites may be used as feed. However, it is particularly preferred to use high rank coals. In particular it is preferred to use coals with the following characteristics: (as defined by the British Coal Classification System 1956).

Carbon content greater than 92.0 wt %,
Hydrogen content less than 3.9 wt %,
Volatile matter content less than 9.0 wt %.

All values are on a dry mineral matter free basis. Where a coal coke or char is used it is preferably prepared by carbonising at not more than 800° C., preferably not more than 500° C.

The carbonaceous feed preferably has low ash content preferably not more than 5% wt. The content of carbonate ash in particular is preferably low.

The particle size of the carbonaceous feed is preferably not more than 1 mm.

The mixture of NaOH and KOH preferably contains NaOH and KOH in the molar range ratio of 70:30 to 30:70. It is particularly preferred to use mixtures whose composition is close to that of the eutectic mixtures, e.g. 65:35 to 57:42 and 45:55 to 55:45 (NaOH:KOH).

A mixture of NaOH and KOH in a molar ratio of 1:1 form an eutectic mixture melting at 170° C., which has a low viscosity.

The hot liquid mixture of NaOH and KOH is preferably at a temperature of at least 100° C. and is preferably not more than 300° C. Commercially available KOH usually contains a proportion of water (10–20% by weight). The presence of this water does not have an adverse effect on the production of the carbon. However in order to minimise energy consumption in the production of the carbon it is preferred to have not more than 20% wt water present in the mixture of KOH and NaOH.

The intimate mixture of carbonaceous feed and molten NaOH/KOH mixtures is preferably formed by introducing carbonaceous feed into the molten liquid with agitation to aid in the wetting of the carbonaceous feed with the molten liquid.

The relative weight ratio quantities of solid alkali metal hydroxide (including inherent water) to carbonaceous feed is preferably in the range 4:1 to 1:1. Preferably the weight ratio is in the range 3.5:1 to 1.5:1.

U.S. Pat. No. 4,082,694 stresses the importance of holding the carbonaceous feed, after initial contact with the hydrous KOH at a temperature in the range typically 315° to 480° C. and for 15 minutes to 2 hours. In the process of the present invention the mixture after the addition of the carbonaceous feed has been completed may be heated to temperature of not less than 700° C. for example a temperature of not less than 800° C. The preferred rate of heating is in excess of 1° C. per minute.

The carbonaceous material is then maintained at the required temperature for at least 5, more preferably 60 to 90 minutes.

The heat treated product is then cooled in an inert atmosphere and washed to remove alkali metal compounds.

The washed product may then be dried by conventional means.

EXAMPLES

The invention will now be illustrated by means of the following Examples.

In these examples the adsorbtive powers of the carbon were tested by measuring methane uptake.

These tests were carried out using a high pressure microbalance made by the firm of Sartorius. The weight of methane adsorbed by a sample (ca. 0.5 g) of known weight and volume was determined at a methane pressure of 200 psig (1.48 MPa absolute).

EXAMPLE 1

A mixture of solid potassium hydroxide pellets (water content 13%wt) and solid sodium hydroxide pellets (ca 2% wt water) were mixed together in a NaOH/KOH molar ratio of 1:1 calculated on dry weight. The mixture was then melted in a nickel crucible maintained at 200° C. to give a low viscosity liquid.

A coke prepared by carbonising coal at 500° C. was added with stirring to the molten mixture. The coke particles had a diameter of 1 mm or less and an ash content of 4.1 wt %.

The coal was Pittsburgh No. 8 coal from Pennsylvania (Washington County) USA.

The quantity of coke was such as to give a weight ratio of NaOH/KOH mixture (including any water in the pellets) to coke of 3:1, and stirring was continued until an intimate mixture had formed. The mixture was allowed to cool to ambient temperature. The nickel crucible was then placed in an oven with an inert (N$_2$) atmosphere in which it was heated at a rate of ca. 5° C./min to 850° C. The crucible was allowed to remain at 850° C. for 90 minutes. It was then cooled to 100° C. while maintaining the nitrogen atmosphere. The carbon was then allowed to cool to ambient temperature (20°-25° C.) in air.

The carbon was then washed with water to remove soluble alkali metal compounds and then dried under nitrogen at 100° C.

The methane adsorption of the carbon was then determined as described above.

The methane adsorption was 128.4 mg g$^{-1}$ and 38.5 mg cm$^{-3}$.

COMPARATIVE TEST A

This is a comparative experiment not according to the invention. An experiment was carried out as in Example 1 but only KOH was employed as the activating agent. The methane adsorption was determined under the same conditions as in Example 1. The results are shown in Table 1.

COMPARATIVE TESTS B AND C

Experiments were carried out as in Comparative Test A but using mixtures of KOH and NaOH in the molar ratios of 10:90 and 90:10 respectively. The results obtained are shown in Table 1.

EXAMPLES 2 AND 3

Experiments were carried out as in Comparative Tests B and C but using molar ratios of KOH:NaOH of 30:70 and 70:30 respectively. The results are shown in Table 1.

COMPARATIVE TEST D

An experiment was carried out as in Comparative Test A but using a different feedstock.

The carbonaceous feed used was anthracite from the Cynheidre colliery of the United Kingdom National Coal Board. This coal has the following characteristics:
Carbon 95.2 wt %
Hydrogen 2.9 wt %
Volatile matter 4.6 wt %
All figures are on a dry, mineral matter free basis.

COMPARATIVE TESTS E AND F

Experiments were carried out as in Comparative Tests B and C. The results are given in Table 2.

EXAMPLES 4, 5 AND 6

Experiments were carried out as in Examples 1, 2 and 3. The results are given in Table 2.

A study of the above results shows that when considering the methane adsorption capacity in terms of amount of methane adsorbed per unit weight the replacement of some of the KOH by NaOH tends to give a reduction in the methane adorption capacity. However for many uses of adsorbent carbon the limitation is not on the weight of the adsorber but on the volume of the adsorber because of space limitations or because of the costs of building larger containers for the adsorber. As can be seen from the experiments reported above there is a specific range of KOH/NaOH mixtures which will give a carbon having increased adsorption per unit volume. In Table 1 the maximum increase in volume adsorption capacity compared with carbon made pure KOH is about 20%, while in Table 2 the increase is almost 32%.

TABLE 1

| Pittsburgh 500° C. coke | | | | |
|---|---|---|---|---|
| | KOH:NaOH | Tap density | CH$_4$ adsorption | |
| Experiment | mol ratio | g cm$^{-3}$ | mg g$^{-1}$ | mg cm$^{-3}$ |
| B | 10:90 | 0.28 | 112.6 | 31.5 |
| 2 | 30:70 | 0.35 | 119.4 | 41.8 |
| 1 | 50:50 | 0.30 | 128.4 | 38.5 |
| 3 | 70:30 | 0.27 | 144.9 | 39.1 |
| C | 90:10 | 0.25 | 125.8 | 31.6 |
| A | 100.0 | 0.26 | 133.4 | 34.7 |

TABLE 2

| Anthracite Starting Material | | | | |
|---|---|---|---|---|
| | KOH:NaOH | Tap density | CH$_4$ adsorption | |
| Experiment | mol ratio | g cm$^{-3}$ | mg g$^{-1}$ | mg cm$^{-3}$ |
| E | 10:90 | 0.42 | 107.7 | 44.8 |
| 5 | 30:70 | 0.45 | 113.5 | 51.5 |
| 4 | 50:50 | 0.45 | 126.5 | 57.2 |
| 6 | 70:30 | 0.38 | 135.8 | 52.4 |
| F | 90:10 | 0.30 | 136.2 | 40.8 |
| D | 100:0 | 0.30 | 144.7 | 43.4 |

Note:
Tap density is defined as the apparent bulk density of the powdered material after 10 minutes of continual tapping in a volumetric cylinder.

We claim:
1. A process for the production of active carbon by treating a carbonaceous feed with KOH and subsequently carbonising the carbonaceous feed is characterized in that the carbonaceous feed is intimately mixed with a hot liquid mixture comprising KOH and NaOH in a molar ratio of NaOH to KOH of from 80:20 to 20:80, there being not more than 20% by weight water present in the mixture of KOH and NaOH and the relative weight ratio quantities of solid alkali metal hydroxide to carbonaceous feed being in the range of 4:1 to 1:1 heating the mixture to a temperature of at least 500° C., in an inert atmosphere maintaining the mixture at this temperature for not less than 5 minutes, then allowing the carbon to cool in an inert atmosphere to below combustion temperature, followed by washing to remove alkali metal compounds.

2. The process according to claim 1 wherein the carbonaceous feed is a coal having the following characteristics
Carbon content greater than 92.0 wt %
Hydrogen content less than 3.9 wt %
Volatile matter content less than 9.0 wt %,
all on dry mineral matter free basis.

3. The process according to claims 1 or 2 wherein the molar ratio of NaOH to KOH is in the range 30:70 to 70:30.

4. The process according to claims 1 or 2 wherein the carbonaceous feed has an ash content of not more than 5% weight.

5. The process according to claims 1 or 2 wherein the carbonaceous feed has a particle size of not more than 1 mm.

6. The process according to claims 1 or 2 wherein the carbonaceous feed is added to a molten liquid NaOH/KOH mixture with agitation.

7. The process according to claims 1 or 2 wherein after mixing of the carbonation feed has been completed the mixture is heated to a temperature of not less than 700° C. at a rate not less than 1° C. per minute.

* * * * *